US012605736B2

(12) United States Patent
Barth et al.

(10) Patent No.: US 12,605,736 B2
(45) Date of Patent: Apr. 21, 2026

(54) METHOD OF PRODUCTION OF A HEATING COMPONENT BY THERMAL SPRAY AND HEATING COMPONENT

(71) Applicant: OERLIKON METCO AG, WOHLEN, Wohlen (CH)

(72) Inventors: Alexander Barth, Constance (DE); Ville Eronen, Jyväskylä (FI)

(73) Assignee: OERLIKON METCO AG, WOHLEN, Wohlen (CH)

( * ) Notice: Subject to any disclaimer, the term of this patent is extended or adjusted under 35 U.S.C. 154(b) by 0 days.

(21) Appl. No.: 18/274,806

(22) PCT Filed: Feb. 24, 2022

(86) PCT No.: PCT/EP2022/054651

§ 371 (c)(1),
(2) Date: Jul. 28, 2023

(87) PCT Pub. No.: WO2022/180162

PCT Pub. Date: Sep. 1, 2022

(65) Prior Publication Data

US 2024/0149296 A1 May 9, 2024

Related U.S. Application Data

(60) Provisional application No. 63/153,631, filed on Feb. 25, 2021.

(51) Int. Cl.

| | |
|---|---|
| ***B05D 1/02*** | (2006.01) |
| ***B05D 5/12*** | (2006.01) |
| ***B05D 7/00*** | (2006.01) |

(52) U.S. Cl.
CPC ................ *B05D 1/02* (2013.01); *B05D 5/12* (2013.01); *B05D 7/50* (2013.01)

(58) Field of Classification Search
CPC . H05B 3/20; H05B 3/26; H05B 3/262; H05B 3/265; H05B 3/28; H05B 3/32;
(Continued)

(56) References Cited

U.S. PATENT DOCUMENTS 3,919,441 A * 11/1975 Horiki .................. B32B 15/085 427/125
4,444,804 A 4/1984 Ferrari
(Continued)

FOREIGN PATENT DOCUMENTS

CN 2000-173753 6/2000
CN 107447178 12/2017
(Continued)

OTHER PUBLICATIONS

Michels et al., "High Heat Flux Resistance Heaters from VPS and HVOF Thermal Spraying", Experimental Heat Transfer, vol. 11:4, DOI: 10.1080/08916159808946570 (1998), ., pp. 341-359.
(Continued)

*Primary Examiner* — Michael P Wieczorek
(74) *Attorney, Agent, or Firm* — GREENBLUM & BERNSTEIN, P.L.C.

(57) ABSTRACT

A heating component and method of producing a heating component. The heating component includes a coating system applied to a substrate; and a sealant applied as at least one of a continuous or closed layer over the coating system.

13 Claims, 3 Drawing Sheets

(58) Field of Classification Search
CPC . H05B 3/286; F24C 7/04; F24C 7/043; F24C 7/046; F24C 7/06; F24C 7/062; F24C 7/067; B05D 1/02; B05D 5/12; B05D 7/50
See application file for complete search history.

(56) References Cited

U.S. PATENT DOCUMENTS

| | | | | |
|---|---|---|---|---|
| 6,924,468 | B2 * | 8/2005 | Abbott | H05B 3/68 219/465.1 |
| 8,746,164 | B2 | 6/2014 | Mole et al. | |
| 10,112,457 | B2 | 10/2018 | Bytzek et al. | |
| 10,625,571 | B2 | 4/2020 | Bytzek et al. | |
| 2004/0108307 | A1 * | 6/2004 | Gadow | H05B 3/748 219/468.1 |
| 2006/0049162 | A1 | 3/2006 | Abbott | |
| 2009/0272728 | A1 * | 11/2009 | Abbott | H05B 3/68 219/399 |
| 2010/0323124 | A1 | 12/2010 | Vartabedian et al. | |
| 2015/0014293 | A1 | 1/2015 | Bytzek et al. | |
| 2015/0014424 | A1 | 1/2015 | Bytzek et al. | |

FOREIGN PATENT DOCUMENTS

| | | |
|---|---|---|
| CN | 107979882 | 5/2018 |
| CN | 110784946 | 2/2020 |
| EP | 2 815 626 | 6/2016 |
| EP | 2 815 627 | 6/2016 |

OTHER PUBLICATIONS

Scheitz et al., "Thermisch gespritzte keramische Schichtheizelemente, Thermally sprayed multilayer ceramic heating elements", Thermal Spray Bulletin (2011), ., pp. 88-92.

Int'l Search Report (Form PCT/ISA/210) conducted in Int'l Appln. No. PCT/EP2022/054651(Apr. 8, 2022).

Int'l Written Opinion (Form PCT/ISA/237) conducted in Int'l Appln. No. PCT/EP2022/054651(Apr. 8, 2022).

China Office Action conducted in counterpart China Appln. No. 202280014296.5 (Oct. 1, 2025).

Japan Office Action conducted in counterpart Japan Appln. No. 2023-548592 (Nov. 19, 2025).

* cited by examiner

METHOD OF PRODUCTION OF A HEATING COMPONENT BY THERMAL SPRAY AND HEATING COMPONENT

CROSS-REFERENCE TO RELATED APPLICATION

This application claims the benefit and priority of U.S. Provisional Application No. 63/153,631 filed Feb. 25, 2021, the disclosure of which is expressly incorporated by reference herein in its entirety.

BACKGROUND

1. Field of the Invention

The invention is directed to a method of producing a coating system produced by thermal spray forming a heating component.

2. Discussion of Background Information

Electric heaters are required in the thermal management of the batteries and passenger cabin heating in electric vehicles to maintain an optimum operation temperature between 10-45° C. The required heating power is relatively high at 2-8 kW and the requirement to save space and weight of the heaters produced by thermal spray are a very suitable technology. The coating systems for such electric heaters are described e.g. in the article by Michels et al. "High Heat Flux Resistance Heaters from VPS and HVOF Thermal Spraying," *Experimental Heat Transfer*, Vol. 11:4, pp. 341-359, DOI: 10.1080/08916159808946570 (1998); the article by Scheitz et al., "Thermisch gespritzte keramische Schichtheizelemente, Thermally sprayed multilayer ceramic heating elements," *Thermal Spray Bulletin*, p. 88-92 (2011); and in Europe Patent Nos. EP 2 815 626 (and U.S. counterparts U.S. Pat. No. 10,112,457 and U.S. Patent Publication Application No. 2015/0014424) and EP 2 815 627 (and U.S. counterparts U.S. Pat. No. 10,625,571 and U.S. Patent Publication Application No. 2015/0014293), the disclosures of which are expressly incorporated by reference herein in their entireties.

FIG. 1 shows known electric heaters produced by coating systems. The left-hand side of FIG. 1 shows a top view of a conductive heating circuit 14 on an insulating/insulation layer of an oxide ceramic. On the right-hand side, a cross-section of a typical coating system is shown, which includes a substrate 11 at the bottom, a bond coat 12, first insulation layer 13, part of the conductive heating circuit 14 and an insulation layer 15 on top. The patterned conductive heating circuit 14 is connected to an external power supply.

The cross-sectional view of the typical coating system in FIG. 1 is more clearly shown in the schematic illustration in FIG. 2, where the cross-sectional representation of prior art electric heater 1 consists of five layers and common elements between FIGS. 1 and 2 are provided with same reference numerals, the electric heater 1 including:

a) a metallic bond coat 12, NiCr, having a thickness of 15 to 50 μm to improve adhesion to a substrate 11;

b) an electrically insulating ceramic material 13, e.g., $Al_2O_3$, having a thickness of 400 to 600 μm to electrically separate a heating element 14 from the substrate 11;

c) the heating element 14, which includes a metallic layer, e.g., NiCr, in particular a patterned metallic layer that is applied in a meander type layout. The width, length and thickness of the conductive meandering path of heating element 14 are designed to produce an electric resistance suitable to achieve the required total electric power of 2 to 8 kW at the given voltage of 350 to 850 V;

d) an electrically insulating ceramic material 15, e.g., $Al_2O_3$, having a thickness of 150 to 350 μm to electrically separate heating element 14 from the surrounding environment; and e) an electrically conductive layer 16, e.g., a copper based alloy, that is patterned at zones with a sufficient thickness of 150 to 300 μm to allow heating element 14 to be connected to an external power source (not shown), e.g., by soldering.

SUMMARY

Embodiments are directed to a method of producing a heating component, e.g., an electric heating element, via a thermal spray process that is simplified with respect to the thermal process by which the known electric heating element is produced.

In embodiments, the method simplifies the known art by replacing/eliminating one of the thermally sprayed coatings, e.g., the ceramic top insulation layer, and performing a sealing procedure to produce a heating component having improved electric insulation to the substrate and the environment. This combination of a simplified thermal spray process and the sealing procedure allows high performance heating elements in an efficient manner.

Embodiments are directed to a heating component that includes a coating system applied to a substrate; and a sealant applied as at least one of a continuous or closed layer over the coating system.

According to embodiments, the coating system can include a heater element formed over the substrate; and an insulation layer formed between the substrate and heater element. Further, the coating system may further include a conductive layer applied over the heater element to form contacts for an external power supply. The sealant can permeate the coating system to improve insulating properties of the insulation layer. Optionally, the coating system can include a bond layer formed over the substrate and the insulation layer is formed over the bond layer.

In accordance with other embodiments, a thickness of the insulation layer can be 50-300 μm.

In other embodiments, a thickness of the sealant above the coating system can be 0.05-5.0 mm.

In still other embodiments, the coating system may include only one insulation layer.

Embodiments are directed to a method for producing a heating component. The method includes applying a coating system to a substrate; and applying a sealant over the coating system as at least one of a continuous or closed layer.

According to embodiments, the coating system may include a heater element formed over the substrate; and an insulation layer formed between the substrate and heater element. The coating system may further include a conductive layer applied over the heater element for form contacts for an external power supply. Further, the sealant can permeate the coating system to improve insulating properties of the insulation layer. Moreover, at least the insulation layer can be formed by thermal spraying. The sealant may penetrate the coating system to improve dielectric properties of the insulation layer. Optionally, the coating system can include a bond layer formed over the substrate and the insulation layer is formed over the bond layer.

In embodiments, a thickness of the insulation layer is 50-300 μm.

In other embodiments, the sealant is applied to a thickness of 0.05-5.0 mm above the coating system.

In still other embodiments, the coating system may include plural layers applied by thermal spraying. The plural layers applied by thermal spraying can include a heater element and an insulation layer. The insulation layer can be sprayed over the substrate and heater element can be sprayed onto the insulation layer. Optionally, a bond layer can also be thermally sprayed over the substrate and the insulation layer can be sprayed over the bond layer.

In accordance with still yet other embodiments, the coating system may include only one insulation layer.

Embodiments are directed to a heating component that includes a coating system applied to a substrate and a sealant applied over the coating system. The sealant permeates the coating system to improve insulating properties of the insulation layer, a thickness of the sealant above the coating system is 0.05-5.0 mm, and the coating system includes only one insulation layer.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
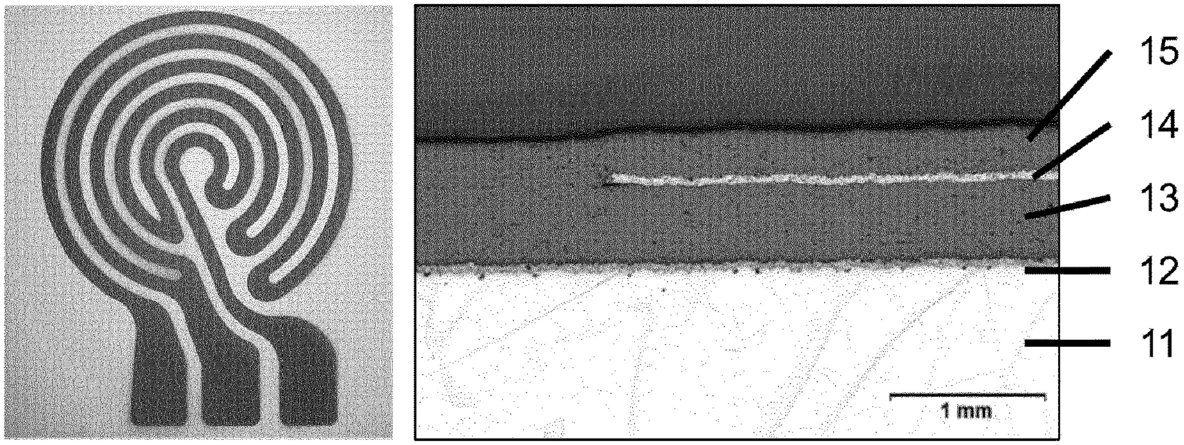
FIG. 1 illustrates a known coating system forming a heating element.
Figure 2:
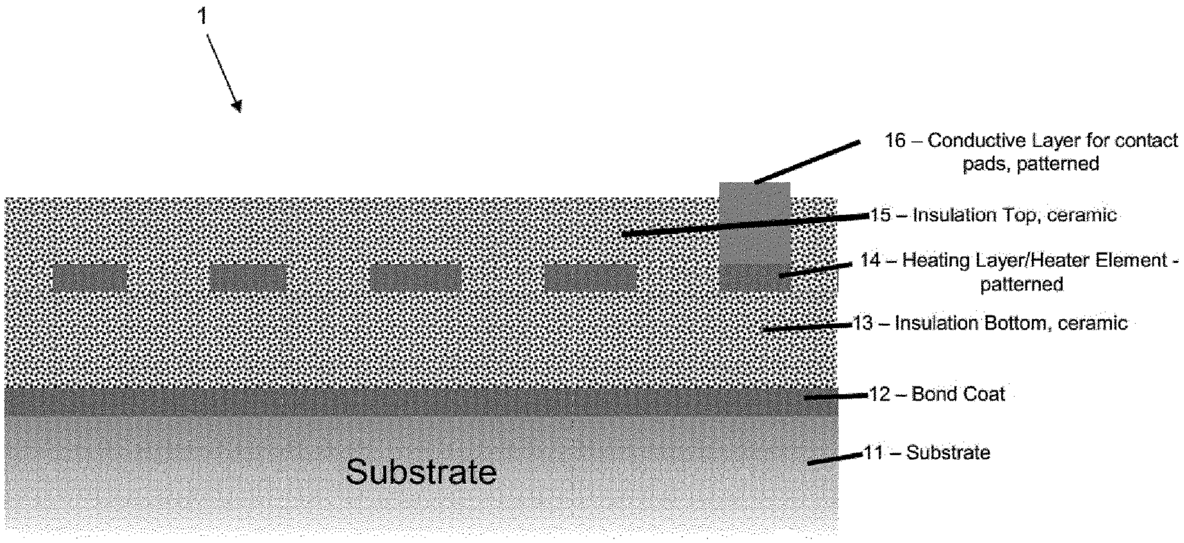
Prior Art Fig. 2
FIG. 2 schematically illustrates a cross-section of a known coating system of a heating element.
Figure 3:
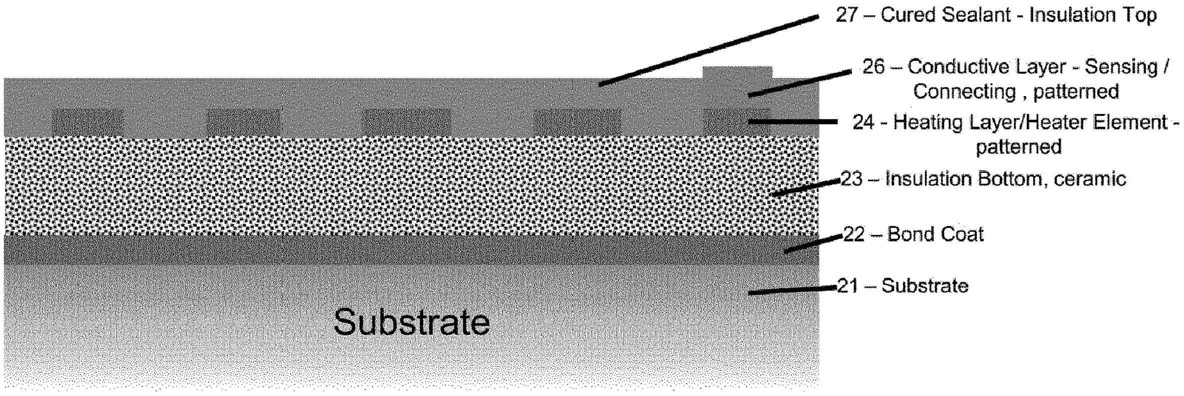
FIG. 3 schematically illustrates a cross-section of a coating system according to embodiments of a heating element.

FIG. 3 illustrates an exemplary embodiment of a coating system 2 for forming a heating component on a substrate 21. In contrast to the prior art component depicted in FIG. 2, in this exemplary embodiment, insulation layer 14 of the known heating element is omitted from the coating system and a sealant 27 is used to cover the completed heating component. Thus, in the exemplary embodiment depicted in FIG. 3, coating system 2 is formed by an optional metallic bond coat 22, e.g., NiCr, pure Ni, CrN (with Cr content between 10 to 50% wt.), $Ni_5Al$ (with Al content between 3 to 20% wt.), pure Al, stainless steels or Inconel alloys, being thermal sprayed, e.g., via an atmospheric plasma spraying (APS), electric arc wire spraying (EAW), combustion spray (CS), cold gas spray (CGS) process, or similar process from a thermal spray gun, such as F4 MB-XL, SINPLEXPRO or TRIPLEXPRO-210 all from Oerlikon Metco, to a thickness of 10 to 50 μm, and preferably a thickness of 20 to 30 μm to improve adhesion of the heating component to a metal substrate 21 that is preferably made from steel, stainless steel or aluminum based alloys. An electrically insulating ceramic material 23, e.g., $Al_2O_3$, $ZrO_2$, MgO or mixtures, is thermally sprayed onto substrate 21 or onto optional metallic bond coat 22, e.g., via APS, suspension plasma spray (SPS), high velocity oxygen fuel (HVOF), detonation spraying, combustion powder spray (flame spray) or similar process, to a thickness of 150-350 μm, and preferably 250-300 μm to electrically separate heating element 24 from substrate 21/bond layer 22. Heating element 24, which is formed by, e.g., via APS, EAW, CS or CGS, comprises an electrically conductive material layer, e.g., NiCr, pure Ni, CrN (with Cr content between 10 to 50% wt.), $Ni_5Al$ (with Al content between 3 to 20% wt.), pure Al, high chromium steels, Inconel alloys or conductive ceramics like $TiB_2$ or $TiO_2$, and is, in particular, a patterned electrically conductive layer that is preferably applied with a meander type layout. The width, length and thickness of the conductive meandering path of heating element 13 are designed to produce an electric resistance suitable to achieve the required total electric power of 2 to 8 kW at the given voltage of 350 to 850 V. By way of non-limiting example, for an electric vehicle battery, which can be understood to deliver power of 2-8 kW, heating element 13 can be suitably dimensioned with a width of 2-10 mm, a length of 500-1500 m and a thickness of 20-30 μm.

Electrically conductive layer 26, e.g., a copper based alloy, is patterned at zones via, e.g., APS, EAW, CP, CW, CS, HVOF or other process, with a sufficient thickness of e.g., 120-200 μm and preferably 150-165 μm, to allow heating element 24 to be connected to an external power source (not shown), e.g., by soldering. However, in lieu of the insulation layer applied over the heating element in the known art, i.e., ceramic top insulation layer 15 in FIG. 2, a sealant layer 27 is applied over conductive layer 26 and heating element 24 of coating system 2. The sealant is applied in a liquid form by brushing, spraying or dispensing. This sealant can be, e.g., an epoxy-like sealant with low solvent content, such as METCOSEAL ERS from Oerlikon Metco or DICHTOL HM-RT or a polymeric sealant. The sealant is applied so that, depending upon the type of sealant, the sealant permeates, infiltrates and/or envelopes coating system 2 until a layer thickness above electrically insulating ceramic material 23 of greater than 0 (>0)-5.0 mm, preferably 0.01-1.0 mm, especially 0.05-0.15 mm, is achieved. However, the layer thickness is less than a sum of the thicknesses of conductive layer 26 and heating element 24 so that sealant layer 27 surrounds conductive layer 26, so that at least an upper portion of conductive layer 26 rises above the sealant layer 27. Moreover, by way of non-limiting example, the sealant layer 27 may be applied with a thickness that is at least 50 μm greater than the thickness of heating element 24, and preferably 100 μm greater than the thickness of heating element 24. Sealant layer 27 can be cured according to particular requirements of the sealant. However, an opening can be provided in the sealant in order for the external power source to access contacts for heater element 24 via electrically conductive layer 26.

The exemplary embodiment of the heating component in FIG. 3 utilizes only three or four layers, where the bond layer is optional, in which at least one of the layers and preferably all of the layers are thermally sprayed coating layers, yet provides improved insulation properties of insulation layer 23 due to improved sealing of insulation layer 23. Further, the exemplary embodiment is able to avoid the upper insulation layer 15 in the known art, i.e., above the heating element 14, because the sealant of sealant layer 27 penetrates the full coating system and thereby improves the electrically insulating properties of insulation layer 23 by increasing breakdown voltage and decreasing leakage currents. Moreover, these improved properties offered by the use of the sealant in sealant layer 27 allows the coating system to reduce the thickness of insulation layer 23 from 500 μm, as in the known art, to 50-350 μm, and preferably 150-300 μm. Moreover, the sealant of sealant layer 27 can be applied in such an amount that sealant that cannot infiltrate or be contained by the coating system 2 will form a continuous film over coating system 2 that is electrically insulating. Sealant layer 27 can be applied onto insulation layer 23 (and over heating element 24) to at least a thickness of 50 μm above, and preferably 100 μm above, heating element 24. In this way, the thickness of sealant layer 27, which is preferably less than the sum of the thicknesses of conductive layer 26 and heating element 24, forms islands of conductive layer 26 rising above the surface of sealant layer 27. Further, the thickness of sealant layer 27 can be, e.g., greater than 0 (>0)-5.0 mm, and is preferably 0.01-1.0 mm, and more preferably 0.05-0.15 mm.

Embodiment 1

Coating system 2 is formed by applying insulation layer 23, heater element 24 and conductive layer 26, and optionally bond coat 22, by a thermal spray process, e.g., APS or other suitable thermal spray process. In areas where heating element 24 is to be connected to the power supply, covers are arranged to mask contact pads so that they are still accessible after the application of sealant layer 27. A 2-component epoxy-like sealant, e.g., METCOSEAL ERS from Oerlikon Metco or DICHTOL HM-RT can be applied in such a quantity that a closed liquid film of 0.1-1 mm is formed over coating system 2. As there is no top insulation layer 15 as in prior art to penetrate, more sealant from sealant layer 27 accesses the insulation layer 23, thereby improving the dielectric properties to separate the heating layer 24 and the substrate 21. In separate measurements, it was shown that, after applying the sealant of sealant layer 27, the discharge resistance of insulation layer 23, e.g., $Al_2O_3$, can be increased from about 5 kV/mm to up to 50 kV/mm. In view of this increase in discharge resistance, insulation layer 23 can be reduced in thickness by 50% to a minimum thickness of about 50 μm without increasing the risk of short-circuiting heating element 24 to substrate 21.

The excessive sealant on top of the coating system 2 forms a hard, dense resin-like overlay forming an electrically insulating layer that is impermeable to humidity. This excessive sealant coating is what allows coating system 2 to dispense with the insulation layer over the heating element in the known art. The resin-like overlay can resist temperatures up to 300° C., which is sufficient for using the heating component on a water cooled heater. The resin-like coating also achieves better values in breakdown voltage than a thermal sprayed insulation coating, as the thermal sprayed insulation suffers from porosity and thin crack networks. Moreover, application of this epoxy-type sealant does not require sophisticated equipment and, unlike APS layers, there is no losses of material.

Further benefits can be achieved by applying vibrations to coating system 2 during the heat curing treatment to avoid enclosed air bubbles in the sealant, which can thereby avoid pin-holes that bear the risk of undesired discharge to other components above the heating element.

An even higher degree of penetration of the sealant can be achieved by vacuum impregnation. The component with the full coating system and masking of the contact pads is placed in a vacuum vessel above the sealant liquid. At low pressure or near vacuum conditions the component is placed into the resin and then the pressure is brought back to atmospheric pressure. The amount of excessive sealant on the surface must be adapted in a separate processing step by adding of removing sealant.

Embodiment 2

Insulation layer 23, heater element 24 and conductive layer 26 of coating system 2, and optionally bond coat 22, can be applied and masked as described in Embodiment 1. A one-component polymeric sealant can be applied in a manner similar to that described in Embodiment 1 so that excessive sealant forms a continuous overlay over the full surface of coating system 2. The thickness of this excessive sealant layer is in a range of 0.1-1 mm. This sealant requires a 6 hour drying period followed by heat treatment. While this sealant has a reduced capability to penetrate coating system 2, this sealant layer has very high electric insulating properties and thereby avoids effectively discharging and short-circuiting to nearby components. The formed overlay remains elastic and is resistant to a large number of liquid chemicals and is stable up to 500° C. before decomposing.

Embodiment 3

Insulation layer 23, heater element 24 and conductive layer 26, and optionally bond coat 22, of coating system 2 can be applied and masked as described in Embodiment 1. One of the sealants mentioned in Embodiment 1 and 2 can be applied on the full surface of coating system 2 in an amount so that excessive sealant forms a very thin film of up to 0.01-0.1 mm. A thin sheet of plastic that can withstand temperatures of 350° C. made from e.g., polyether ether ketone (PEEK), epoxy, glass, ceramic fiber (asbestos replacement), boron nitride, aluminum oxide, is placed on top of the excessive sealant film as a cover. The excessive sealant will act as an adhesive that bonds the cover smoothly to coating system 2, electrically insulates coating system 2 and protects coating system 2 from moisture pick-up and mechanical damage.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A heating component comprising:

a coating system applied to a substrate; and a sealant applied in liquid form as at least one of a continuous or closed layer over the coating system that permeates the coating system, the sealant one of comprising epoxy or being a polymeric sealant, wherein a thickness of the sealant above the coating system is 0.05-5.0 mm, wherein the coating system comprises:

a heater element formed over the substrate and comprising an electrically conductive material; and an insulation layer formed between the substrate and heater element and comprising an electrically insulating ceramic.

2. The heating component according to claim 1, wherein the coating system further comprises a conductive layer applied over the heater element for form contacts for an external power supply.

3. The heating component according to claim 1, wherein the coating system further comprises a bond layer formed over the substrate and the insulting layer in formed over the bond layer.

4. The heating component according to claim 1, wherein a thickness of the insulation layer is 50-300 μm.

5. The heating component according to claim 1, wherein the coating system includes only one insulation layer.

6. A method for producing a heating component, the method comprising:

applying a coating system to a substrate; and applying a sealant in liquid form over the coating system as at least one of a continuous or closed layer that permeates the coating system, the sealant one of comprising epoxy or being a polymeric sealant, wherein a thickness of the sealant above the coating system is 0.05-5.0 mm, wherein the coating system comprises:

a heater element formed over the substrate and comprising an electrically conductive material; and an insulation layer formed between the substrate and heater element and comprising an electrically insulating ceramic; and wherein the heater element and the ceramic insulation layer are applied by thermal spraying.

7. The method according to claim 6, wherein the coating system further comprises a conductive layer applied over the heater element for form contacts for an external power supply.

8. The method according to claim 6, wherein the coating system further comprises a bond layer formed on the substrate and the insulation layer is formed over the bond layer.

9. The method according to claim 6, wherein a thickness of the insulation layer is 50-300 μm.

10. The method according to claim 6, wherein the insulation layer is sprayed over the substrate and the heater element is sprayed onto the insulation layer.

11. The method according to claim 6, wherein a bond layer is applied over the substrate by thermal spraying, and the insulation layer applied over the bond layer.

12. The method according to claim 6, wherein the coating system includes only one insulation layer.

13. A heating component comprising:

a coating system applied to a substrate; and a sealant, which is applied in liquid form over the coating system to permeate the coating, the sealant one of comprising epoxy or being a polymeric sealant, wherein a thickness of the sealant above the coating system is 0.1-1.0 mm, and wherein the coating system comprises:

a heater element formed over the substrate and comprising an electrically conductive material; and only one insulation layer formed between the substrate and heater element and comprising an electrically insulating ceramic.

* * * * *